United States Patent [19]

Sellstedt

[11] 3,879,408
[45] Apr. 22, 1975

[54] PROCESS FOR PREPARING ANHYDROPENICILLINS

[75] Inventor: John H. Sellstedt, King of Prussia, Pa.

[73] Assignee: American Home Products Corporation, New York, N.Y.

[22] Filed: Sept. 8, 1972

[21] Appl. No.: 287,394

[52] U.S. Cl..................... 260/306.7 R: 260/239.1; 260/306.7 C; 424/271
[51] Int. Cl............................................ C07d 99/16
[58] Field of Search.................. 260/239.1, 306.7 R

[56] References Cited
UNITED STATES PATENTS
3,311,638   3/1967   Wolfe ............................. 260/306.7
3,635,953   1/1972   Wolf et al. ...................... 260/239.1

OTHER PUBLICATIONS
Saul Wolfe et al., Journal American Chemical Soc., Jan. 4, 1963, pp. 643–644, Vol. 85.
Morrison and Boyd, Organic Chemistry, Aug. 1966, pg. 663.

Primary Examiner—Donald G. Daus
Assistant Examiner—David E. Wheeler
Attorney, Agent, or Firm—Stephen Venetianer

[57] ABSTRACT

A process for preparing anhydropenicillins is described which comprises reacting 6-aminopenicillanic acid or a 6-acylated aminopenicillanic acid with a suitable reactive nitrogen compound which will replace the hydroxy moiety of the carboxyl group of the penicillin as described in U.S. Pat. No. 3,635,953 and converting the resulting 2-amido penicillin compound to the corresponding anhydroampicillin by reaction in the presence of a strong base at a temperature between about 25°C. and −40°C. The anhydropenicillins have numerous uses as described in U.S. Pat. No. 3,311,638.

8 Claims, No Drawings

PROCESS FOR PREPARING ANHYDROPENICILLINS

This invention relates to an improved process for making anhydropenicillins.

Anhydroampicillins are useful as intermediates for the preparation of cephalosporins (e.g., U.S. Pat. No. 3,311,638) or other active antibacterial agents [e.g., S. Wolfe et al., Tetrahedron Letters, 39, 3385 (1969)]. These compounds may also be converted back to penicillin acids [e.g., S. Wolfe et al, J. Amer. Chem. Soc., 91, 7205 (1969)].

Various methods have been described in the literature for preparing anhydroampicillins, all of which have a common drawback of producing low yields (i.e., of the order of 25 percent or less). Such methods are described in (a) U.S. Pat. No. 3,311,638, (b) S. Wolfe et al, Can. J. Chem., 46, 2549 (1968), (c) S. Wolfe et al, Can. J. Chem., 46, 459 (1969) and (d) S. Wolfe et al, Tetrahedron Letters, 39, 3385 (1969).

It has now been discovered that anhydropenicillins can be prepared in substantially higher yields than heretofore reported in the literature.

The process of the present invention is depicted by the following reaction scheme:

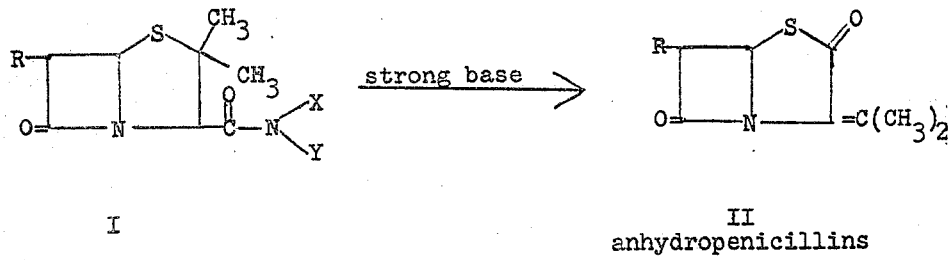

I
II
anhydropenicillins wherein:
R is selected from the class consisting of

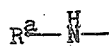

and an organic radical of the formula

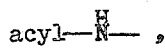

the acyl group being derived from an organic carboxylic acid or a reactive functional derivative thereof; X and Y when taken separately are both electron withdrawing groups and when X and Y are taken together with the nitrogen atom to which they are attached complete a cyclic electron withdrawing group; and $R^a$ is an amino protecting group.

The reaction of a compound of formula I with a strong base is preferably carried out in an inert organic solvent at a temperature between about −40°C. and +25°C., preferably between about −20°C. and 10°C. Generally, the reaction is carried out using a molar ratio of strong base to a compound of formula I of 1:1 to 2:1, preferably not greater than about 1.3:1.

In carrying out the foregoing reaction, the strong base should be either a strong tertiary amine having a pka in the range of 9 through 13 or a non-nucleophilic base. Preferably, a strong tertiary amine is used. Illustrative of suitable tertiary amines are triethylamine; 1,5-diazabicyclo [4.3.0.] non-5-ene; 1,5-diazabicyclo [5.4.0.]undec-5-ene; diisopropylethylamine, N-dimethyl piperazine; trimethylamine. Illustrative of non-nucleophilic bases are alkali metal alkoxides such as potassium t-butoxide and tert-amyloxide; and sodium triphenyl methane.

Suitable reaction-inert solvents that may be employed in carrying out the foregoing reaction include dichloromethane, methylene chloride, tetrahydrofuran, acetone, toluene, dioxane, or any other aprotic solvent.

In carrying out the process of the present invention, any free amino group should be protected during the reaction to form the anhydropenicillin. The selection of an amino protecting group is not critical except that it must be stable under the reaction conditions used in the process of the present invention and be removable after completion of the reaction by hydrogenation or other conventional prior art means without alteration of the β-lactam nucleus. Suitable protecting groups exemplified by $R^a$ are carbobenzoxy, o-nitrophenylsulfenyl, t-butyloxycarbonyl, tosyl, 3-pentyloxycarbonyl, trichloroethoxycarbonyl and trityl. Similarly, where the acyl radical embraced by R contains a α-amino or other free amine substituent, it should be protected during the reaction which forms the anhydropenicillin. Such suitable protecting groups are illustrated by those which are representative of $R^a$.

The preferred "acyl" radicals defined by

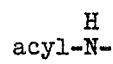

are those contained in a natural penicillin. As used herein the term "natural penicillin" means those produced by fermentation as well as those biosynthetically prepared by the addition of certain precursors to the fermentation broth. Examples of such acyl groups are those in Penicillin G, Penicillin V, Penicillin S, Penicillin F, Penicillin K and Penicillin O. However, other

radicals may be used such as those defined by $R^1$ in column 3 of U.S. Pat. No. 3,311,638 and column 2 of U.S. Pat. No. 3,635,953, the disclosures of which are incorporated herein by reference.

The election withdrawing groups represented by X and Y alone or taken together are those defined in column 2, lines 58–66 and column 3, lines 1 through 75 of U.S. Pat. No. 3,635,953, the disclosure of which is incorporated herein as though fully described herein. The preferred materials defined by formula I are those designated by the formula

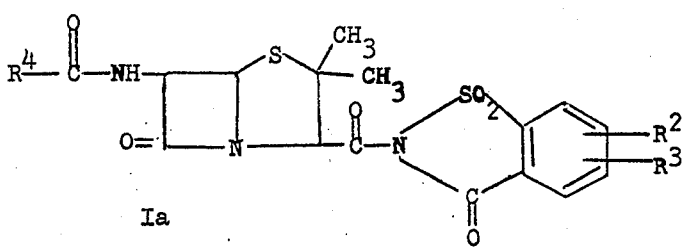

Ia wherein:

R² and R³ are selected from the class consisting of hydrogen, lower alkyl, lower alkoxy and halogen. R² and R³ are preferably hydrogen.

R⁴ is selected from the group consisting of:

(a) 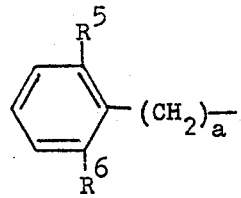

(b) 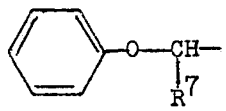

and (c) 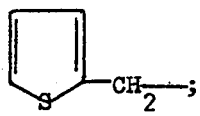

wherein R⁵ and R⁶ are selected from the group consisting of hydrogen and lower alkoxy, preferably hydrogen; R⁷ is selected from the group consisting of hydrogen, lower alkyl and phenyl; and $a$ is an interger from 0 to 1.

The term "lower alkyl" as conventionally used herein, alone or in conjunction with the other designated groups, is intended to encompass straight chain or branched chain alkyl groups containing from one to about six carbon atoms, e.g., methyl, ethyl, propyl, isopropyl, butyl, isobutyl, pentyl, 2-ethylpropyl, hexyl, 2-propylpropyl, and the like. Similarly, the terms "lower alkoxy" as used herein, alone or in conjunction with other designated groups, are intended to encompass straight chain or branched chain groups also containing from one to about six carbon atoms. The term "halogen" as used conventionally herein is intended to encompass chlorine, bromine, iodine and fluorine.

In preparing the anhydropenicillins of formula II, it is not necessary to start with an isolated 2-amidopenicillin of formula I. The anhydropenicillin can be prepared by in situ formation of a compound of formula I (without isolation) and conversion of such a compound in the presence of a strong base to the desired anhydropenicillin. This procedure comprises reacting in the same reaction vessel a penicillin of the formula

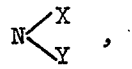 III or an alkali metal salt thereof (R has the same meaning as previously described) with a suitable reactive nitrogen compound which will replace the hydroxy moiety of the carboxyl group with a group of the formula $$N\begin{matrix}X\\Y\end{matrix},$$

thereby forming a 2-amidopenicillin, in the presence of a strong base and inert organic solvent as previously described at a temperature between −40°C. and +25°C. to obtain the anhydropenicillin of formula II. Suitable reactive nitrogen compounds are those illustrated in column 4, lines 45–75, column 5, lines 1–60, and in the examples of U.S. Pat. No. 3,635,953, the disclosure of which is incorporated herein as though fully described and set forth herein. The preferred reactive nitrogen compound is a 3-halosaccharin (e.g., 3-chloro-1,2-benzothiazole-1,1-dioxide) or a substituted derivative thereof.

The following examples are illustrative of the process of the present invention.

EXAMPLE 1

ANHYDROPENICILLIN V

Saccharmimido penicillin V (51.6 g, 0.1 mole) is dissolved in 500 ml of dichloromethane, and at 0 to −20°C., 15.23 g of 1,5-diazabicyclo [5.4.0]undec-5-ene is added in 100 ml of dichloromethane over 45 min. The solution is allowed to warm to room temperature. The solution is washed twice with water, saturated sodium bicarbonate, cold dilute hydrochloric acid, water, brine, and dry with MgSO₄. The solution is stripped in vacuo, giving 31 g of a yellow foam. The methyl peaks in the NMR indicate that the foam contains 76 percent of the title compound, giving an overall yield of 71 percent. Chromatography on activity 2–3 silica gel with 10 percent ethyl acetate in benzene removes all of the impurity.

The saccharmido penicillin V can be prepared as described in Example 1 of U.S. Pat. No. 3,635,953 in yields between 70 and 75 percent with a purity of about 92 percent.

EXAMPLE 2

ANHYDROPENICILLIN G

Saccharimido penicillin G (49.96 g, 0.1 mole) is dissolved in 1 liter of dichloromethane, and at 0 to −10°, 15.22 g of 1,5-diazabicyclo[5.4.0]undec-5-ene is added in 50 ml of dichloromethane over 80 min. After 2 hr. at 0 to −10°C. the reaction is worked-up in a manner similar to Example 1, giving 33 g of a light yellow foam. The methyl peaks in the NMR indicate that the foam contains 78 percent of the title compound, giving an overall yield of 81 percent.

The saccharimido penicillin G is prepared as follows:

To a 500 ml. 3-neck flask fitted with stirrer, thermometer, and nitrogen inlet is charged 48.0 g. (0.129 mole) of potassium penicillin G, 200 ml. of methylene chloride, and 4.8 ml. of quinoline, and the mixture is cooled to 10°C. Pseudo saccharin chloride (28.6 g.) is added portionwise maintaining the temperature below 30°C. The mixture is stirred for three hours at room temperature, and then diluted with 200 ml. of hexane.

After cooling to 5°–10°C. and stirring for one hour, the product is collected by filtration, washed with hexane and dried to remove a majority of the solvent. The resulting solids are washed by stirring in 200 ml. of water and filtering. After washing with methanol, the product is dried; yield, 60.6 g. or 94 percent of theory; purity by iodometric assay, 88 percent.

EXAMPLE 3

Following the procedure of Example 2, anhydroampicillin may be prepared by reacting 2-carbobenzoxy ampicillin with 3-chloro-1,2-benzisothiazole 1,1-dioxide to form the saccharimide of 2-carbobenzoxy ampicillin which is converted to anhydroampicillin by reaction with 1,5-diazabicyclo[5.4.0]undec-5-ene in the manner described in Example 1.

EXAMPLE 4

Anhydronafcillin may be prepared from the reaction of the saccharimide of 2-ethoxynaphthyl penicillin with potassium t-butoxide in the manner described in Example 1.

EXAMPLE 5

Anhydro 1-aminocyclohexane penicillin may be prepared by reacting 1-carbobenzyoxyamino cyclohexane penicillin with 3-chloro-1,2-benzisothiazole 1,1-dioxide to form the saccharamide derivative which is converted to anhydro 1-aminocyclohexane penicillin in the manner described in Example 1.

EXAMPLE 6

Anhydropenicillin V is prepared as described in Example 1, except that 2 moles triethylamine is used as the strong base per mole of saccharmido penicillin V and the reaction is carried out at room temperature. The yield of anhydropenicillin V is 50 percent.

What is claimed is:

1. A process for preparing an anhydropenicillin of the formula:

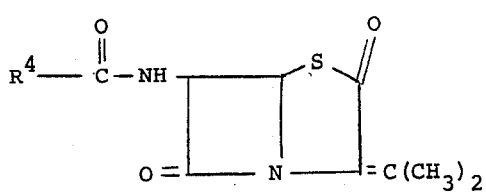

wherein:
R⁴ is selected from the group consisting of:

(a) ; (b)

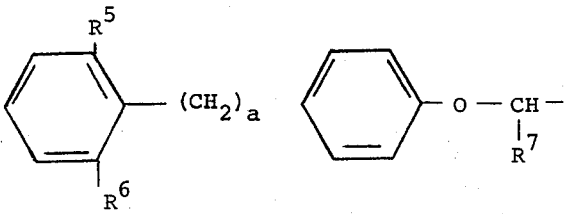

and (c)

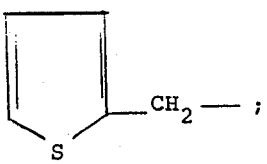

R⁵ and R⁶ are selected from the group consisting of hydrogen and lower alkoxy; R⁷ is selected from the group consisting of hydrogen, lower alkyl and phenyl; and $a$ is 0 or 1; which process comprises the step of reacting a 2-amido penicillin of the formula:

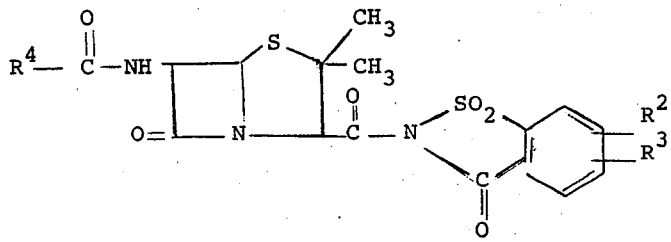

wherein:
R⁴ has the same meaning as earlier defined in this claim; and R² and R³ are selected from the class consisting of hydrogen, lower alkyl, having from one to six carbon atoms, lower alkoxy, having from one to six carbon atoms and halogen; with a tertiary amine having a pka in the range of about 9 to about 13 at a temperature between about −40°C and about +25°C in the presence of an inert anhydrous organic solvent.

2. A process according to claim 1 wherein the temperature is between about −20°C and about 10°C and the molar ratio of said tertiary amine to said 2-amido penicillin being between 1:1 and about 1.3:1.

3. A process according to claim 1 wherein $R^2$ and $R^3$ are each hydrogen.

4. A process according to claim 3 wherein said strong base is 1,5 diazabicyclo[5.4.0]undec-5-ene.

5. A process according to claim 4 wherein $R^4$ is benzyl.

6. A process according to claim 4 wherein $R^4$ is phenoxy.

7. A process according to claim 1 wherein said tertiary amine is present in the reaction medium in which said 2-amido penicillin is formed from its corresponding penicillanic acid or alkali metal salt thereof.

8. A process of claim 1 wherein the 2-amido penicillin is the α-amino protected Saccharamide of ampicillin.

* * * * *